United States Patent
Keskar

(10) Patent No.: US 11,669,555 B2
(45) Date of Patent: Jun. 6, 2023

(54) SYSTEM AND METHOD OF CREATING INDEX

(71) Applicant: Innoplexus AG, Eschborn (DE)

(72) Inventor: Abhijit Keskar, Pune (IN)

(73) Assignee: INNOPLEXUS AG, Eschborn (DE)

(*) Notice: Subject to any disclaimer, the term of this patent is extended or adjusted under 35 U.S.C. 154(b) by 206 days.

(21) Appl. No.: 16/367,583

(22) Filed: Mar. 28, 2019

(65) Prior Publication Data

US 2020/0097492 A1 Mar. 26, 2020

Related U.S. Application Data

(60) Provisional application No. 62/664,427, filed on Apr. 30, 2018.

(51) Int. Cl.
| | |
|---|---|
| *G06F 16/31* | (2019.01) |
| *G06F 16/93* | (2019.01) |
| *G06F 16/38* | (2019.01) |
| *G06F 16/908* | (2019.01) |

(52) U.S. Cl.
CPC .......... *G06F 16/322* (2019.01); *G06F 16/313* (2019.01); *G06F 16/381* (2019.01); *G06F 16/908* (2019.01); *G06F 16/93* (2019.01)

(58) Field of Classification Search
CPC ...... G06F 16/322; G06F 16/381; G06F 16/93; G06F 16/313; G06F 16/908
See application file for complete search history.

(56) References Cited

U.S. PATENT DOCUMENTS

| | | | | |
|---|---|---|---|---|
| 9,996,535 | B1* | 6/2018 | Skidmore | G06F 16/93 |
| 2006/0053173 | A1* | 3/2006 | Gardner | G06F 16/367 |
| | | | | 707/999.203 |
| 2017/0270184 | A1* | 9/2017 | Huang | G06F 16/901 |

* cited by examiner

*Primary Examiner* — Alex Gofman
*Assistant Examiner* — Erich Alexander Fischer
(74) *Attorney, Agent, or Firm* — Ziegler IP Law Group, LLC

(57) ABSTRACT

A system, that when operated, creates an index for a database arrangement, wherein the system includes a support server and an indexing server communicably coupled to the database arrangement, wherein the support server: receives a document, metadata pertaining to the document, and a document identifier associated with the document; extracts keywords from the document and store the keywords in a meta-document; stores the document identifier corresponding to the metadata in the database arrangement; and provides, to the indexing server, the meta-document and the document identifier; and wherein the indexing server: receives the meta-document and the document identifier from the support server; extracts keywords from the meta-document; and creates the index, wherein the index includes document identifier listed corresponding to the extracted keywords.

4 Claims, 3 Drawing Sheets

| KEYWORD | DOCUMENT IDENTIFIER |
|---|---|
| PHASE | RA-2007A22 |
| TUMOUR | HJ-2105AC2 |
| CLUSTER | BM-5076E76 |
| CYBER SECURITY | SM-8065AF0 |

FIG. 3

SYSTEM AND METHOD OF CREATING INDEX

CROSS-REFERENCE TO RELATED APPLICATIONS

This is a non-provisional patent application based upon a provisional patent application no. U.S. 62/664,427 as filed on Apr. 30, 2018, and claims priority under 35 U.S.C. 199(e).

TECHNICAL FIELD

The present disclosure relates generally to database management and indexing; and more specifically, to systems and methods of creating an index for a database arrangement.

BACKGROUND

With advancement in the field of information technology, data and information has become most valuable assets. Such data and information relate to fields such as: scientific research, business analysis, clinical trials, details of a commercial product, and so forth. In addition, such data and information may be needed by a user for example, a student, a scientist, a research scholar, a business analyst and the like for various purposes such as a project, an experiment, a research paper, a business analysis and so forth. Presently, many searching techniques are available for retrieving data and information relevant to a user-input.

The conventional searching techniques, when in operation, identify one or more keywords (namely, words, phrases, concepts and the like) in the user-input. Subsequently, the conventional searching techniques accesses documents, files, content and information accessible thereto. A relevant output is provided to the user, when a match for the one or more keywords, concepts in the user-input is found in the accessed documents. However, performance of the conventional searching techniques is limited by certain constraints. The conventional searching technique may provide irrelevant results for identical keywords having different contexts. Furthermore, the conventional searching techniques may require a high seek time to identify a relevant document. Consequently, the conventional search techniques may have a high throughput time.

In recent times, searching for the relevant document has become faster and easier owing to currently available searching techniques. The currently available searching techniques in operation create an index of keywords, concepts included in the documents. Subsequently, keywords in the user-input are matched with the keywords in the index. However, the currently available searching techniques cease to perform efficiently when documents, files and content are inaccessible to them. The document, files and content may be inaccessible to the currently available search techniques as they may contain some sensitive and confidential data. Notably, the documents, files and contents may not be accessible due to security reasons citing misuse thereof. The currently available searching technique suffer performance issues as the index of keywords cannot be created when the documents, files and content are inaccessible. Consequently, the keywords, in the user-input cannot be matched due to unavailability of the index. Moreover, a context of the keywords in the user-input may be different from matched keywords of the documents, files and content resulting in retrieval of irrelevant output.

Therefore, in light of the foregoing discussion, there exists a need to overcome the aforementioned drawbacks associated with the currently available indexing techniques.

SUMMARY

The present disclosure seeks to provide a system, that when operated, creates an index for a database arrangement. The present disclosure also seeks to provide a method of creating an index for a database arrangement. The invention disclosed herein provides for a means of identifying usefulness of a document by retrieving information associated with the document.

The present disclosure seeks to provide a solution to the existing problem of determining relevance of a document, when the document is inaccessible to a user.

An aim of the present disclosure is to provide a solution that overcomes at least partially the problems encountered in prior art, and provides a way to access information associated with an inaccessible document and determine a usefulness thereof to a user.

In one aspect, an embodiment of the present disclosure provides a system, that when operated, creates an index for a database arrangement, wherein the system comprises a support server and an indexing server communicably coupled to the database arrangement, wherein the support server:
    receives a document, metadata pertaining to the document, and a document identifier associated with the document;
    extracts keywords from the document and store the keywords in a meta-document;
    stores the document identifier corresponding to the metadata in the database arrangement; and
    provides, to the indexing server, the meta-document and the document identifier; and
wherein the indexing server:
    receives the meta-document and the document identifier from the support server;
    extracts keywords from the meta-document; and
    creates the index, wherein the index comprises document identifier listed corresponding to the extracted keywords.

In another aspect, an embodiment of the present disclosure provides a method of creating an index for a database arrangement, wherein the method is implemented by way of a system comprising a support server and an indexing server communicably coupled to the database arrangement, wherein the method comprises:
    receiving, using a support server, a document, metadata pertaining to the document, and a document identifier associated with the document;
    extracting keywords from the document and store the keywords in a meta-document;
    storing the document identifier corresponding to the metadata in the database arrangement; and
    providing, to the indexing server, the meta-document and the document identifier;
    receiving, using the indexing server, the meta-document and the document identifier from the support server;
    extracting keywords from the meta-document; and
    creating the index, wherein the index comprises document identifier listed corresponding to the extracted keywords.

Embodiments of the present disclosure substantially eliminate or at least partially address the aforementioned problems in the prior art, and enable determination of relevance and usefulness of a document without accessing the document. In addition, the invention ensures nondisclosure of a confidential and sensitive document while providing information about context thereof. Specifically, the present disclosure enables access to information about the document using an index of keywords related to the document. Therefore, a user is enabled to determine context of the document even when accessibility to the document is unavailable. Beneficially, the determination of context of the document saves time and effort of the user. In addition, the user is also financially benefitted as access to the document may require a payment in form of fiat money.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3 illustrated is an exemplary index created by the system (such as in FIG. 1), in accordance with an embodiment of the present disclosure.

Figure 1:
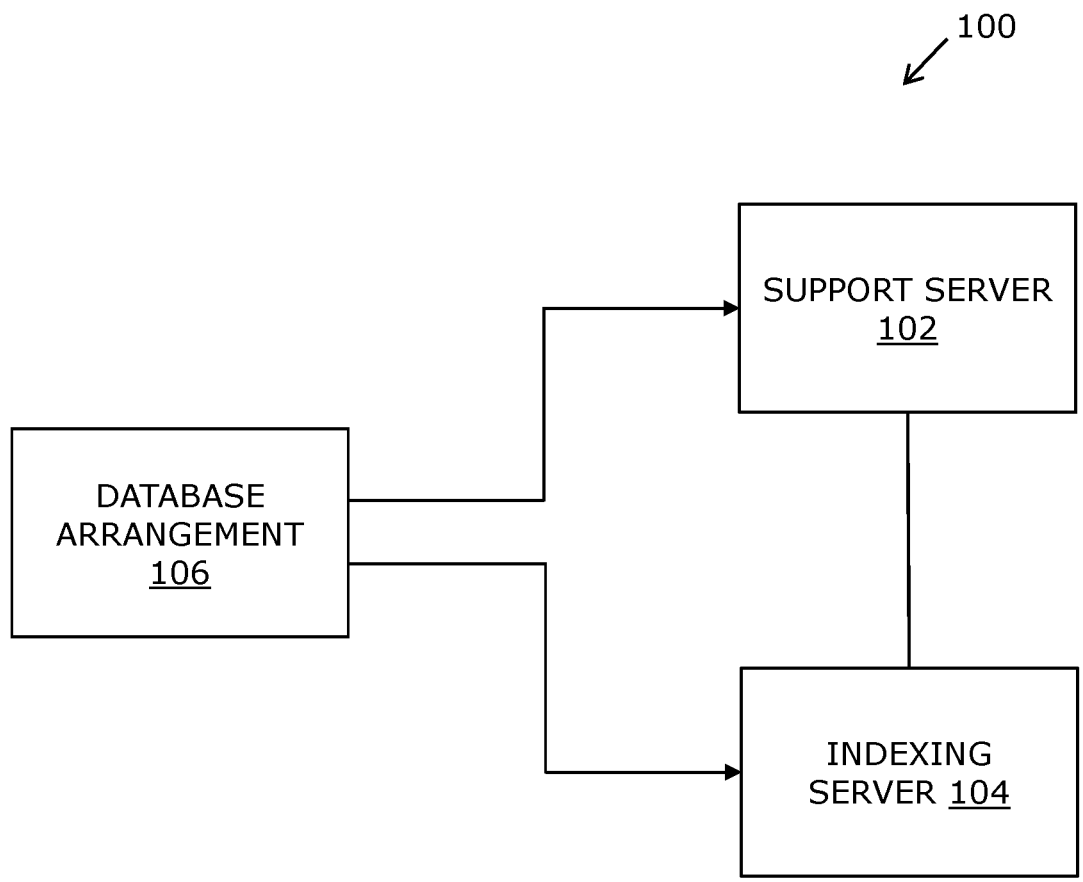
FIG. 1 illustrated is a block diagram of a system, that when operated, creates an index for a database arrangement, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system, that when operated, creates an index for a database arrangement, wherein the system comprises a support server and an indexing server communicably coupled to the database arrangement, wherein the support server:

receives a document, metadata pertaining to the document, and a document identifier associated with the document;

extracts keywords from the document and store the keywords in a meta-document;

stores the document identifier corresponding to the metadata in the database arrangement; and provides, to the indexing server, the meta-document and the document identifier; and wherein the indexing server:

receives the meta-document and the document identifier from the support server;

extracts keywords from the meta-document; and creates the index, wherein the index comprises document identifier listed corresponding to the extracted keywords.

In another aspect, an embodiment of the present disclosure provides a method of creating an index for a database arrangement, wherein the method is implemented by way of a system comprising a support server and an indexing server communicably coupled to the database arrangement, wherein the method comprises:

receiving, using a support server, a document, metadata pertaining to the document, and a document identifier associated with the document;

extracting keywords from the document and store the keywords in a meta-document;

storing the document identifier corresponding to the metadata in the database arrangement; and providing, to the indexing server, the meta-document and the document identifier;

receiving, using the indexing server, the meta-document and the document identifier from the support server;

extracting keywords from the meta-document; and creating the index, wherein the index comprises document identifier listed corresponding to the extracted keywords.

The present disclosure provides a system and method of creating an index for a database arrangement for retrieval of information associated with a document stored therein, wherein the document is inaccessible and may be sensitive and confidential. Furthermore, the invention disclosed herein eliminates a need to share sensitive and confidential documents to determine a usability thereof to the user. Furthermore, the system disclosed herein provides a seamless, easy and faster approach to determine relevance of the document for a user. In addition, the system disclosed is robust and is implementable using existing hardware technologies. Moreover, the method disclosed in the present disclosure has substantially improved cost and time complexity.

In past few decades searching for a document based on a relevance thereof has become faster and efficient owing to existing techniques used for search and retrieval of the document. Such existing techniques, in operation, access content of the document to determine relevance thereof. However, the existing techniques become inefficient in an instance when the document in inaccessible because of constraints such as data security, confidentiality and the like. Therefore, there arises a need to find an approach to identify relevant document without accessing the content thereof.

Disclosed herein is the system, that when operated, creates the index for the database arrangement. The index created by the system comprises the document identifier listed corresponding to keywords included in the document. The index is in form of a list, a tabular arrangement having a plurality of columns and rows, wherein one of the plurality of columns includes keywords and one or more of the plurality of columns include document identifiers, or any other form of representing the keywords and corresponding document identifiers. Therefore, each of the rows include a keyword and one or more document identifiers listed corresponding thereto. Furthermore, the index is created for the database arrangement that is a set of contiguous or non-contiguous memory locations. The database arrangement is configured to store information that is to be referred by way of the index created by the system. The database arrangement optionally can be a local or remote database. Furthermore, the database arrangement optionally can be a cloud-based database. Notably, the database arrangement is accessible by the support server and the indexing server.

As mentioned previously, the system comprises the support server and the indexing server communicably coupled to the database arrangement. The support server is a single or a group of processors that are local to the system. The indexing server is a single or a group of processors that are remote to the system. In an instance, when the support server and/or the indexing server are the group of processors, the group of processors are configured to work in parallel or in pipeline. Furthermore, the support server and/or the indexing server relates to a structure (namely, a module) that include programmable and/or non-programmable components configured to store, process and/or share information. The support server and/or the indexing server include an arrangement of physical computational entities capable of processing data to perform various computational tasks. Furthermore, it should be appreciated that the support server and/or the indexing server may be both single hardware server and/or plurality of hardware servers operating in a centralized or distributed architecture. In an example, the support server and/or the indexing server may include components such as memory, a processor, a network adapter and the like, to store, process and/or share information with other computing components, such as a user device/user equipment.

The communicable coupling of the support server and the indexing server with the database arrangement enables access of data stored therein. The communicable coupling may be through a wired or wireless communication channel. Furthermore, the communication coupling may be established via a communication network, wherein the communication network is an arrangement of interconnected programmable and/or non-programmable components that are configured to facilitate data communication between one or more electronic devices and/or databases. Furthermore, the communication network may include, but is not limited to, one or more peer-to-peer network, a hybrid network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the communication network includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. The communication network connects the support server and the indexing server to the database arrangement, wherein the database arrangement relates to an organized body of digital information regardless of the manner in which the data is represented.

Optionally, the database arrangement may be hardware, software, firmware and/or any combination thereof. For example, the data may be represented in form of a table, a map, a grid, a packet, a datagram, a file, a document, a list or in any other form. The database arrangement includes any data storage software and systems, such as, for example, a relational database like IBM DB2 and Oracle 9. Optionally, the database arrangement may be managed by a database management system, as is common in the art. Furthermore, the database management system refers to the software program for creating and managing one or more databases and data elements therein. Optionally, the database arrangement may be operable to support relational operations and Boolean operations, regardless of whether it enforces strict adherence to relational model, as understood by those of ordinary skill in the art. Additionally, the database arrangement is populated by data elements.

Furthermore, the support server receives the document, metadata pertaining to the document, and the document identifier associated with the document. The document, metadata pertaining to the document, and a document identifier associated with the document is provided to the support server as an input. The document is related to a digital file (namely, page, data structure and so forth) that contains data in form of table, text, image, symbol, graph, map, hyperlink to a data location and/or a combination thereof. Furthermore, the document may be optionally in any file format such as PDF, MS-WORD, JPG, XML and so forth. Additionally, the document may be structured or unstructured. The document contains information associated with a user specific field such as a technical or non-technical research area, a business analysis, a clinical trial and so forth. Furthermore, the document is uniquely identified using the document identifier. The document identifier may be a numerical, alphabetical or alphanumeric string that is associated with the document. The document may be sorted in any order based on the document identifier associated therewith. Moreover, the support server is provided with the metadata containing information pertaining to the document. The metadata has a context similar to the document. Furthermore, contents of the document may or may not be included in the metadata.

Optionally, the document, metadata pertaining to the document, and the document identifier may be provided by the user using any one of: an input interface, command prompt, a drag and drop tool. Alternatively, the document, metadata pertaining to the document, and the document identifier may be provided to the system automatically by a computing device that may be programmed therefor.

In a first example, a document may contain information related to a marketing strategy of a company "A". The document may have a document identifier "TA-864321". Furthermore, the document may have a metadata pertaining thereto, wherein the metadata contains information associated with the document such as company name, application area of the strategy and so forth.

Moreover, the support server extracts keywords from the document and store the keywords in the meta-document. The support server accesses and analyzes contents of the document in order to identify the keywords in the document, wherein keywords are those word, phrases, symbols and the like that has a meaning, a context associated therewith. Subsequently, the support server extracts the keywords that are identified thereby. The keywords extracted by the support server are stored in the meta-document in a structured form for example a list, a table, a chart or any other suitable way of presenting the keywords.

Optionally, the meta-document may be stored in the database arrangement. Alternatively, optionally, the meta-document may be stored in a memory available with the support server or the meta-document may be stored in a temporary memory comprised in the system.

Optionally, the keywords in the document may be identified by way of tokenization and parsing. The support server may parse and tokenize the contents of the document for identifying the keywords.

In an embodiment, the support server extracts keywords using an ontological databank, wherein the ontological databank comprises a plurality of concepts. The ontological databank may be an organized body of digital information that relates to a plurality of concepts (namely, information, ideas, data, and so forth) in a field of interest (namely, subject area, domain and so forth). Furthermore, the ontological databank provides synonyms, phrases and the like related to the keywords. Moreover, the ontological databank provides a structured, optimal and relevant concepts pertaining to the field of interest. Optionally, the ontological databank includes the plurality of concepts in form of a text, an image, an audio, a video, or any combination thereof. Furthermore, the plurality of concepts in the ontological databank may have one or more keywords therein. Notably, data element within the document that is similar to at least one of the plurality of concepts in the ontological databank may be a keyword. Additionally, optionally, ontological databank may provide information pertaining to relationship of a certain keyword from the plurality of concepts to one or more keywords from other concepts. Optionally, the ontological databank may be implemented using hardware, software, firmware and/or any combination thereof. For example, the ontological databank includes any data storage software and/or hardware, such as, a relational database like IBM DB2 and Oracle 9. The keywords extracted using the ontological databank may be stored in the meta-document.

In another embodiment, the meta-document is in JavaScript Object Notation (JSON) format. The JavaScript Object Notation (JSON) format is a lightweight data-interchange format that is easy to read and write. In addition, the JavaScript Object Notation (JSON) format is easy for computing machines to process, parse and generate. Beneficially, the JavaScript Object Notation (JSON) format of the meta-document increases a productivity and throughput of the system by increasing a processing speed thereof.

Furthermore, the support server stores the document identifier corresponding to the metadata in the database arrangement. The document identifier is stored corresponding to the metadata by way of a list, a table or any other way of structured storing that represents an association between the document identifier and the metadata. Specifically, a given document identifier corresponding to the metadata signifies that the metadata contains information corresponding to the document that is uniquely identified by the given document identifier. Beneficially, storing the document identifier corresponding to the metadata makes it easier to retrieve information relevant to the document that is associated with the document identifier. In addition, such a retrieval of information eliminates a need of accessing the document to determine a relevance of the document to a user.

Optionally, the metadata may contain information associated with two or more documents. Consequently, the metadata may have more than one document identifiers corresponding thereto.

Referring to the first example, the metadata pertaining to the document containing information related to the marketing strategy of the company "A" may be stored corresponding to the document identifier "TA-864321".

Moreover, the support server provides, to the indexing server, the meta-document and the document identifier. In other words, the indexing server receives the meta-document and the document identifier by the support server as an input. Notably, the support server is enabled to communicate with the indexing server using a means for communication such as an Ethernet, a Wi-Fi network, a Bluetooth medium or any other wired or wireless channel. In an instance, the input provided to the indexing server may be by way of a command or instruction. In another instance, the input may be provided automatically to the indexing server once the support server stores the document identifier corresponding to the metadata in the database arrangement.

Subsequently, the indexing server receives the meta-document and the document identifier from the support server. A given meta-document having keywords extracted from a given document and document identifier associated with the given document is provided to the indexing server. Furthermore, the support server and the indexing server are pipelined, wherein an output of the support server is provided to the indexing server as input. Optionally, the indexing server may prompt the support server for input. Alternatively, optionally, input may be provided to the indexing server depending upon an availability and/or requirement.

Furthermore, the indexing server extracts keywords from the meta-document. The keywords are accessed by the indexing server in any order (such as linear, random, alphabetical and the like). The indexing server, in operation, accesses and analyses each of the keywords included in the meta-document, wherein the keywords belong to the document identified by the document identifier provided with the meta-document to the indexing server. Optionally, the keywords extracted from the meta-document may be stored in a temporary document for further operations. More optionally, the keywords extracted from the meta-document may be stored in the database arrangement or in a memory available with the indexing server.

Optionally, the indexing server extracts keywords using the ontological databank, wherein the ontological databank comprises the plurality of concepts. The indexing server may access and analyse the plurality of concepts in the ontological databank to identify synonyms, related words and phrases to match with keywords having similar context. The indexing server may associate identified concepts with the document identifiers of matched keywords. The indexing server may extract identified concepts from the plurality of concepts, wherein the identified concepts are indexed as keywords by the indexing server.

The indexing server creates the index, wherein the index comprises document identifier listed corresponding to the extracted keywords. The indexing server creates the index in form of a list, a table and the like. Furthermore, the index includes keywords related to the document and the document identifier associated therewith. The document identifier associated with the extracted keywords refers the metadata pertaining to the document. The index is used to retrieve the metadata stored in the database arrangement, wherein database arrangement comprises the document identifier listed corresponding to the metadata pertaining to the document comprising the extracted keywords.

Optionally, the support server retrieves metadata from the database arrangement by: receiving at least one of keywords in the index for the database arrangement as a user-input; identifying document identifiers corresponding to the user-input from the index for the database arrangement; and retrieving metadata of the document identifiers corresponding to the user-input from the database arrangement. At a first step, when the support server receives at least one of keywords in the index as the user-input, the support server examines the index to identify keywords matching to the keywords in the user-input. The document identifiers of the matching keywords are determined. The metadata of the document identifiers identified by the supporting server are retrieved by accessing the database arrangement. More optionally, the support server may have access to the document using the document identifiers. Therefore, the support server may retrieve the document relevant to the user by using the document identifiers identified by the support server. In an example, when a given user-input contains a plurality of keywords, the document identifier in the index with highest number of matching keywords is identified by the support server.

In an exemplary implementation, a support server may receive a Clinical Trial document related to a drug "Vigorect Oral Gel Shooter", a metadata containing reviews of users of the drug, and a document identifier "RA-2007A22" associated with the Clinical Trial document. It may be noted that the Clinical Trial document may be confidential and may not be accessible. Furthermore, the support server may extract keywords such as "drug composition", "clinical trial phase", "geographical location of clinical trial" from the Clinical Trial document. The keywords "drug composition", "clinical trial phase", "geographical location of clinical trial" and the like may get stored in a meta-document. Furthermore, the support server may store the document identifier "RA-2007A22" corresponding to the metadata containing reviews of users for the drug in a database arrangement. Subsequently, the support server may provide an indexing server with the meta-document and the document identifier "RA-2007A22". The indexing server may access the meta-document and extract the keywords "drug composition", "clinical trial phase", "geographical location of clinical trial" stored therein. Subsequently, the indexing server may create an index in a tabular form containing the keywords "drug composition", "clinical trial phase", "geographical location of clinical trial" and the document identifier "RA-2007A22" listed corresponding thereto. Hence, a user may retrieve the metadata containing reviews of users of the drug by accessing the database arrangement, wherein metadata is identified using the document identifier listed corresponding thereto. Beneficially, the metadata may be used by the user to identify relevance and usefulness of the Clinical Trial document thereto.

The present disclosure also relates to the method as described above. Various embodiments and variants disclosed above apply mutatis mutandis to the method.

Optionally, the method comprises extracting keywords using an ontological databank, wherein the ontological databank comprises a plurality of concepts.

Optionally, the method comprises using the support server to retrieve metadata from the database arrangement by:
receiving at least one of keywords in the index for the database arrangement as a user-input;
identifying document identifiers corresponding to the user-input from the index for the database arrangement; and
retrieve metadata of the document identifiers corresponding to the user-input from the database arrangement.

DETAILED DESCRIPTION OF THE DRAWINGS

Referring to FIG. 1, illustrated is a block diagram of a system 100, that when operated, creates an index for a database arrangement, in accordance with an embodiment of the present disclosure. The system 100 comprises a support server 102 and an indexing server 104 communicably coupled to the database arrangement 106. Furthermore, the support server 102 and the indexing server 104 have a means of communication therebetween.

Figure 2:
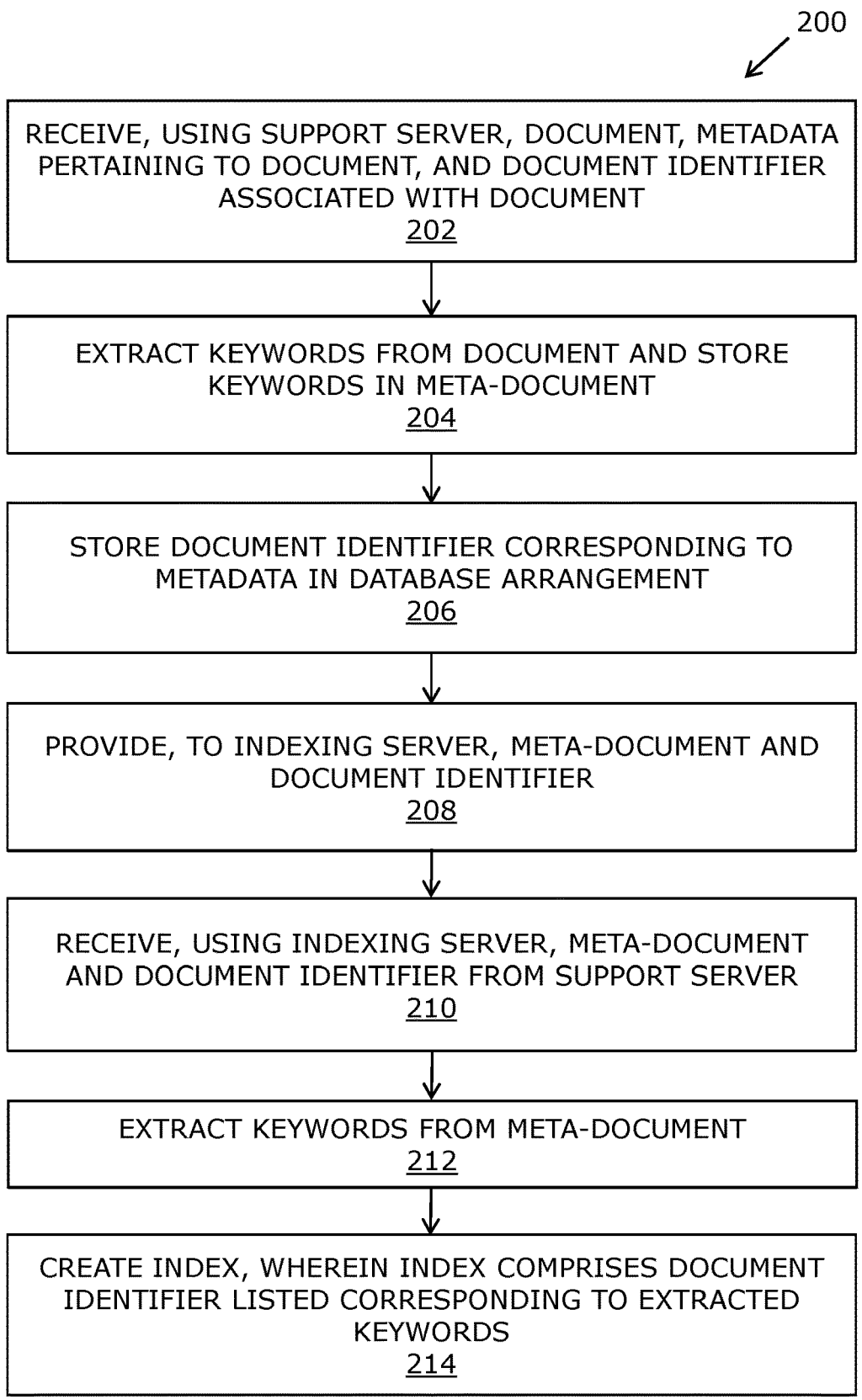
FIG. 2 illustrated are steps of a method of creating an index for a database arrangement, in accordance with an embodiment of the present disclosure.

Referring to FIG. 2, illustrated are steps of a method 200 of creating an index for a database arrangement, in accordance with an embodiment of the present disclosure. At step 202, a document, metadata pertaining to the document, and a document identifier associated with the document are received using a support server. At step 204, keywords are extracted from the document. Subsequently, the keywords are stored in a meta-document. At step 206, the document identifier is stored, corresponding to the metadata, in the database arrangement. At step 208, the meta-document and the document identifier are provided to the indexing server. At step 210, the meta-document and the document identifier are received from the support server using the indexing server. At step 212, keywords are extracted from the meta-document. Subsequently, at step 214, the index is created. The index comprises document identifier listed corresponding to the extracted keywords.

Referring to FIG. 3, illustrated is an exemplary index created by the system 100 (such as in FIG. 1), in accordance with an embodiment of the present disclosure. The index 300 includes a plurality of keywords "PHASE", "TUMOUR", "CLUSTER" and "CYBER SECURITY" and document identifiers "RA-2007A22", "HJ-2105AC2", "BM-5076E76" and "SM-8065AF0" respectively listed corresponding to the keywords. It is to be understood that the index 300 is mere an example and other formats for the index may be created by the system. It will be appreciated that the index may include entries from different documents having different document identifiers that are not mentioned herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system, that when operated, creates an index for a database arrangement to retrieve information contextually similar to a document, wherein the system comprises a support server and an indexing server communicably coupled to the database arrangement, wherein the support server:
receives from the user, the document, metadata containing information contextually similar to the document, and a document identifier associated with the document;

extracts keywords from the document and store the keywords in a meta-document, wherein the meta-document is in JavaScript Object Notation (JSON) format;

associates the document identifier with the metadata in the form of a list;

stores the list comprising the association between the document identifier and the metadata in the database arrangement; and provides, to the indexing server, the meta-document and the document identifier; wherein the document is inaccessible by the indexing server, and wherein the indexing server:

receives the meta-document and the document identifier from the support server;

extracts keywords from the meta-document; and creates the index for retrieving the metadata that is associated with the document identifier in the database arrangement, wherein the index comprises document identifier listed corresponding to the extracted keywords, and wherein the document identifier associated with the extracted keywords in the created index refers the metadata listed corresponding to the document identifier in the database arrangement, wherein the support server retrieves metadata from the database arrangement by:

receiving at least one of the keywords in the index for the database arrangement as a user-input;

identifying keywords in the created index, matching to the at least one of the keywords received as the user-input;

identifying document identifiers listed corresponding to the identified keywords from the created index for the database arrangement; and retrieving the metadata corresponding to the identified document identifier, from the stored list comprising the association between the metadata and the document identifier in the database arrangement.

2. The system of claim 1, wherein the indexing server and the support server extract keywords using an ontological databank, wherein the ontological databank comprises a plurality of concepts, and wherein the support server parses and tokenizes contents of the document for identifying the keywords.

3. A method of creating an index for a database arrangement to retrieve information contextually similar to a document, wherein the method is implemented by way of a system comprising a support server and an indexing server communicably coupled to the database arrangement, wherein the method comprises:

using a support server to receive from a user, the document, metadata containing information contextually similar to the document, and a document identifier associated with the document;

using the support server to extract keywords from the document and store the keywords in a meta-document, wherein the meta-document is in JavaScript Object Notation (JSON) format;

associating the document identifier with the metadata in the form of a list;

storing the list comprising the association between the document identifier and the metadata in the database arrangement; and providing, to the indexing server, the meta-document and the document identifier wherein the document is inaccessible by the indexing server;

receiving, using the indexing server, the meta-document and the document identifier from the support server;

extracting keywords from the meta-document;

creating the index for retrieving the metadata that is associated with the document identifier in the database arrangement, wherein the index comprises the document identifier listed corresponding to the extracted keywords, and wherein the document identifier associated with the extracted keywords in the created index refers the metadata listed corresponding to the document identifier in the database arrangement;

receiving at least one of the keywords in the index for the database arrangement as a user-input;

identifying keywords in the created index, matching to the at least one of the keywords received as the user-input;

identifying document identifiers listed corresponding to the identified keywords from the index for the database arrangement; and retrieving the metadata corresponding to the identified document identifier, from the stored list comprising the association between the metadata and the document identifier in the database arrangement.

4. The method of claim 3, wherein the method comprises extracting keywords using an ontological databank, wherein the ontological databank comprises a plurality of concepts, and wherein the method comprises parsing and tokenizing contents of the document for identifying the keywords.

* * * * *